United States Patent [19]

Hanson

[11] Patent Number: 4,991,698
[45] Date of Patent: Feb. 12, 1991

[54] DAMPING WITH DAMPING MASS INSIDE WHEEL

[75] Inventor: David E. Hanson, Westborough, Mass.

[73] Assignee: Bose Corporation, Framingham, Mass.

[21] Appl. No.: 421,309

[22] Filed: Oct. 13, 1989

Related U.S. Application Data

[63] Continuation of Ser. No. 194,515, May 16, 1988, abandoned.

[51] Int. Cl.⁵ .......................... F16F 7/10; F16F 9/00; A63C 17/12; B60B 37/00
[52] U.S. Cl. .................................... 188/380; 267/221; 301/6 WB; 301/136
[58] Field of Search ................. 267/217, 226, 34, 221; 267/136, 150; 188/378–380; 301/6 WB, 109, 110, 124 R, 136; 280/697, 710, 692

[56] References Cited

U.S. PATENT DOCUMENTS

| | | | |
|---|---|---|---|
| 1,009,424 | 11/1911 | Law | 188/218 X L |
| 1,805,466 | 5/1931 | De Ram | 267/226 X |
| 2,155,521 | 4/1939 | Zavarella | 267/291 X |
| 2,279,783 | 3/1942 | Martellotti | 188/379 X |
| 2,520,180 | 8/1950 | Thelander | 267/221 X |
| 2,537,479 | 1/1951 | Motte | 301/136 X |
| 2,901,239 | 8/1959 | Sethna | 267/224 |
| 2,955,841 | 10/1960 | Faiver et al. | 188/380 |
| 3,422,918 | 1/1969 | Musser, Jr. et al. | 267/221 X |
| 3,810,651 | 5/1974 | Puchas | 267/221 X |
| 4,155,601 | 5/1979 | Ito | 301/6 W B X |
| 4,223,903 | 9/1980 | Grabb et al. | 280/697 X |
| 4,368,807 | 1/1983 | McLean et al. | 188/379 |
| 4,758,018 | 7/1988 | Takizawa et al. | 280/701 X |

FOREIGN PATENT DOCUMENTS

| | | | |
|---|---|---|---|
| 373789 | 5/1907 | France | 301/136 |
| 1409520 | 7/1965 | France | . |

OTHER PUBLICATIONS

On the Application of Optimum Damped Absorber to Vehicle Suspension; Ghoneim and Cheema, Transaction of the ASME, vol. 108, Mar. 1986.

Primary Examiner—Robert J. Oberleitner
Attorney, Agent, or Firm—Fish & Richardson

[57] ABSTRACT

A vehicle suspension system includes a vehicle body subframe, a wheel with a tire mounted upon a wheel hub assembly having a wheel spindle inside the wheel bearing. A wheel damping mass of ogival shape surrounds the outer race of the wheel bearing and is formed with a vertical slot whose length is perpendicular to the major diameter of the ogival cross section. The damping mass is formed with a pair of openings on each side of the vertical slot that accommodates a support assembly including a vertical shaft held by a shaft retainer intermediate the shaft ends, upper and lower bearings and centering springs located between the shaft retainer and each of the latter bearings. Damping fluid dissipates vibrational energy and may comprise a major component of the damping mass.

15 Claims, 3 Drawing Sheets

DAMPING WITH DAMPING MASS INSIDE WHEEL

This application is a continuation of Ser. No. 07/194,515 filed 5-16-88, now abandoned.

The present invention relates in general to wheel damping and more particularly concerns novel apparatus and techniques for damping a wheel substantially in its plane, such as internally of the wheel to reduce torques about the wheel center and accommodate the damping mass in a convenient location.

The use of damping masses is known. For a discussion of vehicle suspension systems with mass damping, reference is made to a paper of Ghoneim and Cheema entitled "On the Application of Optimum Damped Absorber to Vehicle Suspension," 108 Transactions of the ASME Journal of Mechanisms, Transmissions, and Automation in Design 22 (March 1986).

It is an important object of this invention to provide a vehicle suspension system with improved damping.

According to the invention, in a vehicle suspension system having a wheel carrying a tire about the rim of the wheel rotatable about the wheel axis in a rotation plane perpendicular to the wheel axis, there is damping mass means for damping vibrations disposed in the rotation plane and disposed about the wheel axis. Preferably the damping mass means comprises an element of ogival cross section formed with a slot having its length perpendicular to the major axis of the ogival cross section and accommodating centering springs, preferably precompressed, for maintaining the damping mass means centered. Alternatively, the tire could comprise the damping mass, such as by being formed with additional distributed mass or discrete mass elements symmetrical about the wheel axis to maintain dynamic balance. Preferably, vertically mounted dashpots filled with damping fluid comprise means for dissipating vibratory energy from the wheel in the form of heat. Preferably the invention is used in a vehicle suspension system having an actuator connected between the suspended mass, such as the body subframe, and the unsuspended mass, such as the wheel.

The wheel embraces a central plane perpendicular to the wheel axis, and the damping mass means is located in an annular region free of brake elements within the wheel substantially symmetrical about the central plane and relatively translatable with respect to the wheel along a nonrotating damping mass axis passing through the wheel axis and in the central palen. There is damping mass support means for supporting the damping mass means to always be in noncontacting relationship with the wheel.

Numerous other features, objects and advantages of the invention will become apparent from the following specification when read in connection with the accompanying drawing in which.

Figure 1A:
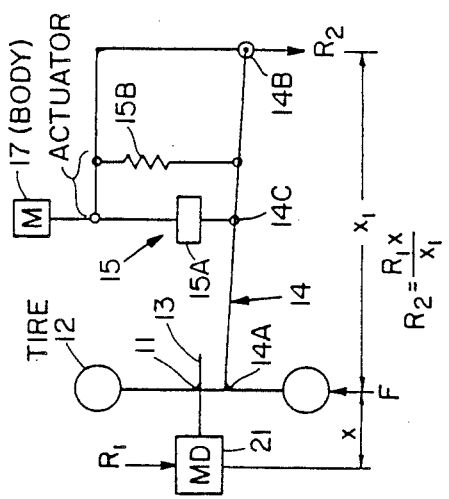
FIGS. 1A, 1B and 1C are diagrammatic representations of suspension systems with damping masses outside, inside and within the wheel, respectively.
Figure 1B:
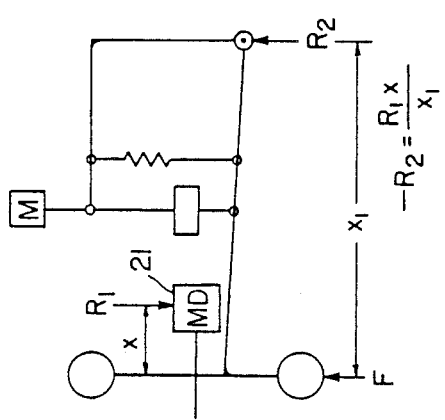
Figure 1C:
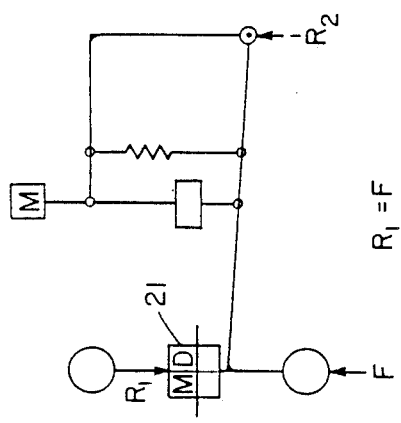

With reference now to the drawing and more particularly FIGS. 1A, 1B and 1C, thereof, there are shown diagrammatic representations of suspension systems having the damping mass outside, inside and within the wheel, respectively. A wheel and hub 11 carries a tire 12 and rotates about a wheel axle 13. A control arm 14 is pivotally connected to the wheel support at one end 14A, to the vehicle body, such as the differential housing, at the other end 14B and to the actuator in the middle at 14C. The actuator 15 includes actuator body 15A and a spring 15B to support the steady-state load or suspended mass 17, in this example, the vehicle body, between control arm 14 and the suspended body mass 17 of the vehicle. A damping mass 21 is shown centered about the wheel axis 13. The force F exerted on tire 12 by the ground from damping mass 21 may be divided into a component $R_1$ passing through the damping mass and a force $R_2$ passing through end 14B such that the sum of the moments of these forces about the wheel center is substantially zero. With the damping mass 21 outside the wheel as shown in FIG. 1A, both the forces $R_1$ and $R_2$ are downward. With the damping mass 21 inside the wheel as shown in FIG. 1B, the reaction force $R_2$ is directed upward. With mass 21 centered in the wheel according to the invention as shown in FIG. 1C, the force $F=R_1$, and there is no damping mass moment about the wheel center transmitted to body 30. Apart from omitting stresses in members caused by these moments, an advantage of the approach according to the invention is that to achieve a given effective damping, the damping mass 21 located within the wheel as shown in FIG. 1C may be less than when positioned as in FIG. 1B. Furthermore, the mechanical packaging is improved with the arrangement of FIG. 1C.

Figure 2:
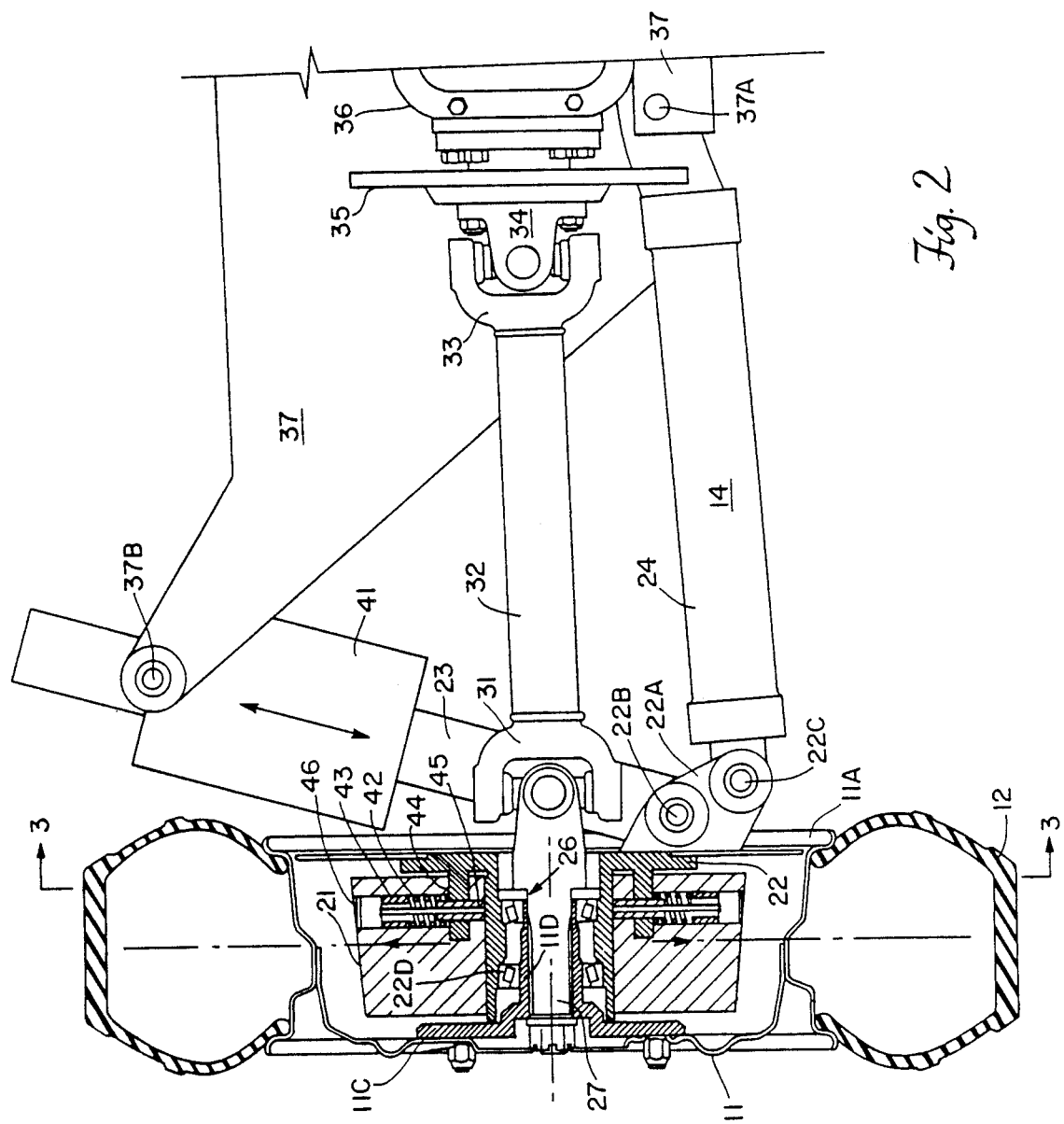
FIG. 2 is a fragmentary plan view partially in section of an embodiment of the invention showing the wheel with damping mass inside relative to other components of the vehicle suspension.

Referring to FIG. 2, there is shown a fragmentary elevation view with wheel structure in section of an embodiment of the invention with the damping mass 21 inside the wheel and hub 11. Wheel and hub 11 includes a wheel rim 11A. A stationary mass support platform 22 carries damping mass 21 and is formed with an inwardly extending arm 22A having a pivot 22B pivotally connecting platform 22 to actuator shaft 23 and a pivot 22C pivotally connecting platform arm 22 to control arm 24. Hub 11 includes a flange 11C extending from inner race 11D of wheel bearing 26 whose outer race 22D comprises mass support 22. Hub flange 11C mates with (by spline) and surrounds wheel spindle 27 connected by U joint 31 to axle 32 connected at the other end by U joint 33 to brake support member 34 that carries brake disk 35 and is connected to the differential housing drive gears 36. The annular region between tire 12 and wheel spindle 27 where damping mass 21 resides is free of brake elements. The other end of control arm 24 is pivotally connected at 37A to body subframe 37. Actuator body 41 is pivotally connected at 37B to body subframe 37 to actuate actuator arm 23 and counter forces exerted by the road on tire 12.

Figure 3:
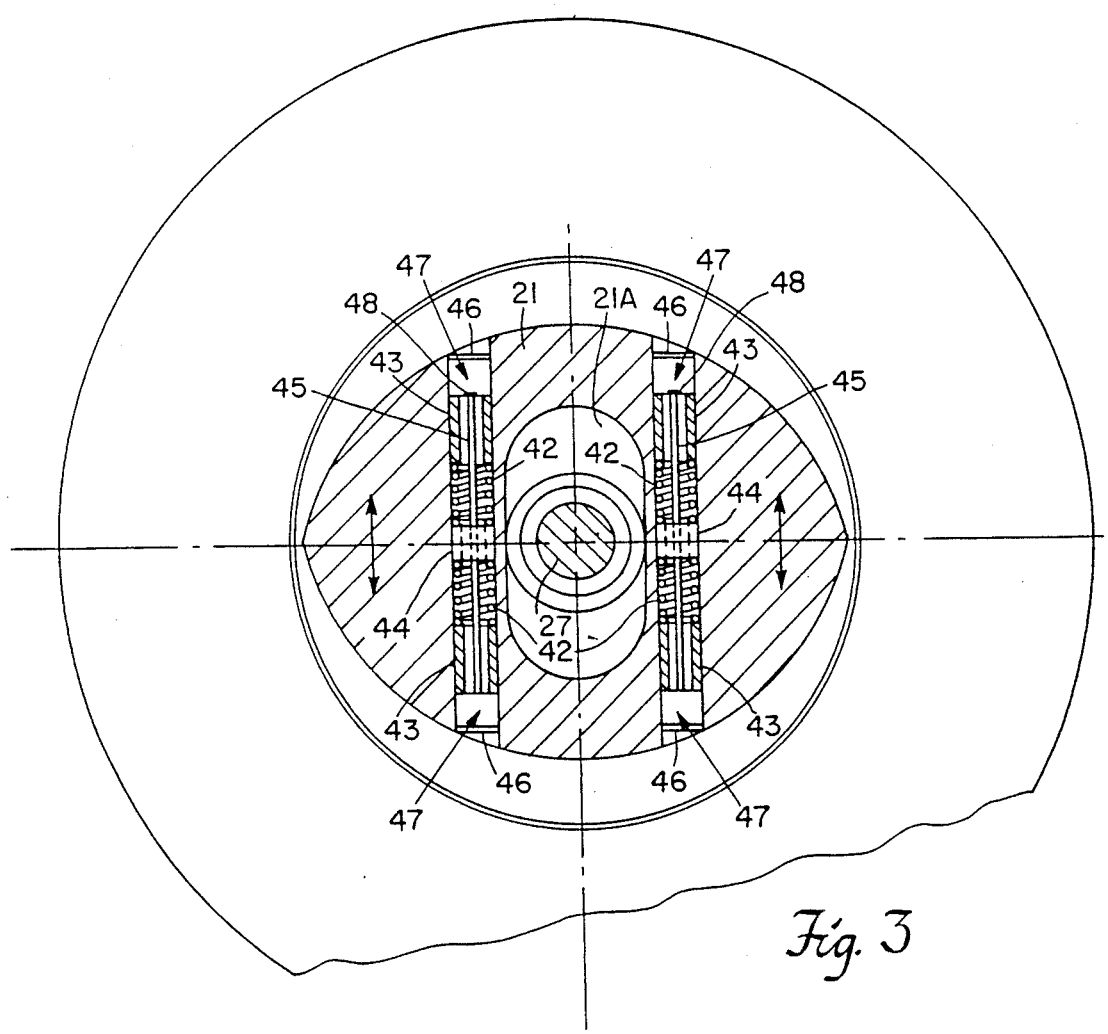
FIG. 3 is an elevation sectional view through section 3—3 of FIG. 2.

Referring to FIG. 3, there is shown an elevation sectional view through section 3—3 of FIG. 2 illustrating structural details of a preferred form of damping mass 21 and structure for supporting it. Damping mass 21 is of generally ogival shape as shown formed with a normally vertical slot 21A having its length perpendicular to the long horizontal axis of the ogival cross section of damping mass 21. Damping mass 21 rests on centering springs 42 between bearings 43 and shaft retainers 44 connected to hollow shafts 45 having chambers 47 that may be regarded as vertical openings on each side of slot 21A filled with damping fluid and capped by end plugs 46. Shaft bearings 43 define cylinders for the hollow vertical shafts 45 to act as pistons. Thus damping mass 21 is free to move vertically, but restrained by spindle 27 from moving horizontally. Vertical movement of damping mass 21 produces fluid displacement across damping orifice 48 to convert vibratory energy from damping mass 21 into frictional heat dissipated at orifice 48.

Figure 4:
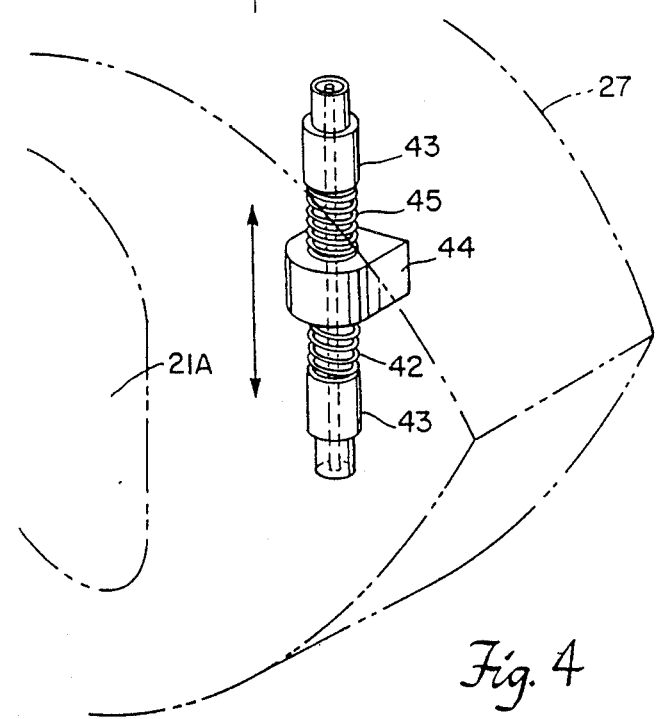
FIG. 4 is a perspective view illustrating the structure of the centering springs.

Referring to FIG. 4, there is shoWn a perspective view of the damping mass control system with edges of damping mass 21 shown in dash-dotted lines to illustrate the structure just described with caps 46 omitted.

Figure 5:
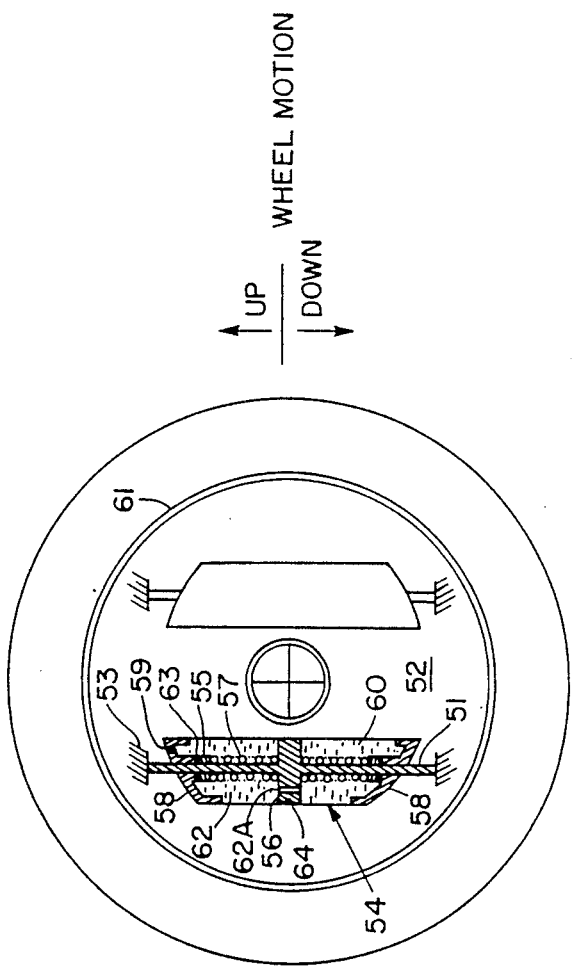
FIG. 5 is a diagrammatic elevation view partially in section of an alternative structure in which damping fluid also functions as a major component of the damping mass.

Referring to FIG. 5, there is shown a diagrammatic plan view, partially in section, of still another structure in which the damping fluid also comprises damping mass. Concentric support shaft 51 is attached to axle hub 52 by mount 53. Damper cylinder 54 is fitted over concentric shaft 51 and ride-in shaft bearings 55. Orifice plate 56 provides additional support. Springs 57 center damper cylinder 54 under static conditions. Damper cap 58 is fitted to damper cylinder 54 and sealed by welding or other suitable means.

Fill port 59 admits damping fluid 60 through back filling as air is evacuated therethrough. As wheel 61 moves up and down, damping fluid 60 is pumped from one damper chamber 62 to the other through damping orifice 62A. Shaft seals 63 prevent leakage of damping fluid 60 past shaft bearing 50. A cylinder seal 64 ensures flow of damping fluid 60 through damping orifice 62.

An advantage of this arrangement is that damping fluid 60 functions both as a viscous damping fluid and a major portion of the damping mass. Suitable fluids for use in the invention may include filled silicones, mercury or other suitable fluid, preferably with sufficient density to provide for adequate damping.

There has been described novel apparatus and techniques for wheel damping inside the wheel. It is evident that those skilled in the art may now make numerous uses and modifications of and departures from the specific apparatus and techniques herein disclosed without departing from the principles of the invention. Consequently, the invention is to be construed as embracing each and every novel feature and novel combination of features present in or possessed by the apparatus and techniques herein disclosed and limited solely by the spirit and scope of the appended claims.

What is claimed is:

1. A vehicle suspension system comprising,
    an unsuspended mass comprising a wheel having a wheel axis with an annular region about the wheel axis free of brake elements, having a wheel spindle and rotatable about the wheel axis and embracing a central plane perpendicular to the wheel axis,
    a suspended mass comprising the vehicle body,
    damping mass means for damping vibrations of said wheel,
    said damping mass means being located within said wheel in said annular region substantially symmetrical about said central plane and relatively translatable with respect to said wheel along a nonrotating damping mass axis passing through said wheel axis and in said central plane,
    and damping mass support means for supporting said damping mass means to always be in noncontacting relationship with said wheel.

2. The vehicle suspension system in accordance with claim 1 wherein said wheel has a bearing and said damping mass means is formed with a central opening in which said bearing is located.

3. The vehicle suspension system in accordance with claim 2 wherein said damping mass means is formed with a vertical slot of width corresponding substantially to the diameter of said bearing for resisting horizontal movement of said damping mass means while allowing vertical movement thereof.

4. The vehicle suspension system in accordance with claim 3 wherein said damping mass means is of generally ogival cross section with the major diameter thereof substantially perpendicular to the length of said slot.

5. The vehicle suspension system in accordance with claim 1 and further comprising,
    an axle connected to the wheel spindle,
    a control arm pivotally connected between the damping mass support means and the vehicle body,
    actuating means for resisting vertical movement of said wheel,
    said actuating means being pivotally connected between said vehicle body and said damping mass support means.

6. The vehicle suspension system in accordance with claim 1 and further comprising,
    energy storage means connected to said damping mass means for exchanging energy therewith,
    and energy dissipating means connected to said damping mass means for dissipating vibrational energy.

7. The vehicle suspension system in accordance with claim 6 wherein said energy storage means comprises a spring and said energy dissipative means comprises a dashpot.

8. The vehicle suspension system in accordance with claim 7 wherein
    said energy storage means and said energy dissipative means being located in said annular region.

9. The vehicle suspension system in accordance with claim 6 wherein said energy dissipating means comprises damping fluid also comprising a major component of said damping mass means.

10. In a vehicle suspension system having an unsuspended mass comprising a wheel having a wheel axis and rotatable about the wheel axis in a rotation plane perpendicular to the wheel axis and a suspended mass comprising the vehicle body, the improvement comprising,
    damping mass means for damping vibrations of said wheel,
    said damping mass means being disposed in said rotation plane and disposed about the wheel axis,
    wherein said wheel has a bearing and said damping mass means is formed with a central opening in which said bearing is located,
    wherein said damping mass means is formed with a vertical slot of width corresponding substantially to the diameter of said bearing for resisting horizontal movement of said damping mass means while allowing vertical movement thereof,
    wherein said damping mass means is of generally ogival cross section with the major diameter thereof substantially perpendicular to the length of said slot, wherein said damping mass means is formed with vertical openings on each side of said slot and further comprising, damping mass supporting means for supporting said damping mass means, said damping mass supporting means having a support assembly seated in each of said openings, each of said support assemblies including, a vertical shaft, a shaft retainer intermediate the ends of said shaft support said shaft, upper and lower bearings, and centering springs between said shaft retainer and each of said upper and lower bearings.

11. The vehicle suspension system in accordance with claim 10 wherein said centering springs are precompressed.

12. The vehicle suspension system in accordance with claim 10 and further comprising, end chambers carrying damping fluid, said vertical shaft being seated in said end chambers and displacing said damping fluid when said damping mass means is in motion.

13. The vehicle suspension system in accordance with claim 12 wherein said vertical shaft is hollow and comprises said damping mass supporting means and further comprising means for allowing passage of said damping fluid from a first of said end chambers to a second of said end chambers.

14. The vehicle suspension system in accordance with claim 13 wherein said means for allowing passage of damping fluid comprises means defining a restrictive orifice for establishing a predetermined damping factor.

15. The improvement in accordance with claim 13 and further comprising a concentric assembly of a damper cylinder accommodating said damping fluid and one of said springs spring connected to said damping mass means, an orifice plate comprising said means for allowing passage and a support shaft.

* * * * *